United States Patent [19]
Hache

[11] 3,930,610
[45] Jan. 6, 1976

[54] METHOD AND APPARATUS FOR OBTAINING ACCURATELY THE ANGLE OF ATTACK OF AN AIRCRAFT

[76] Inventor: Jean-Guy Hache, 453 Charlevoix, Apt. 5, Longueuil, Quebec, Canada

[22] Filed: June 3, 1974

[21] Appl. No.: 475,863

[52] U.S. Cl........ 235/150.2; 73/178 R; 235/150.26; 244/77 D
[51] Int. Cl.² .......................................... G06G 7/78
[58] Field of Search....... 235/150.2, 150.22, 150.26, 235/186; 244/77 D; 340/27 AT; 73/178 R

[56] References Cited
UNITED STATES PATENTS

| | | | |
|---|---|---|---|
| 3,091,962 | 6/1963 | Corson et al. | 235/150.2 X |
| 3,398,267 | 8/1968 | Hattendorf | 235/150.26 |
| 3,654,443 | 4/1972 | Dendy et al. | 235/150.2 |
| 3,814,912 | 6/1974 | Manke et al. | 235/150.2 |

Primary Examiner—Malcolm A. Morrison
Assistant Examiner—Jerry Smith
Attorney, Agent, or Firm—Larson, Taylor, Hinds

[57] ABSTRACT

This invention relates to a method and apparatus for obtaining the angle of attack of an aircraft developed as a result of an appropriate processing of the vertical speed, the airspeed, and the pitch attitude of the aircraft. The latter involves resolving the inverse sine of the vertical speed signal over the airspeed signal, and subsequently differentially combining the end product of the inverse sine computation and the chord line angle signal. The air speed signal is corrected by a corrective network which receives a feedback signal proportional to the angle of attack as well as a signal proportional to drift angle.

3 Claims, 7 Drawing Figures

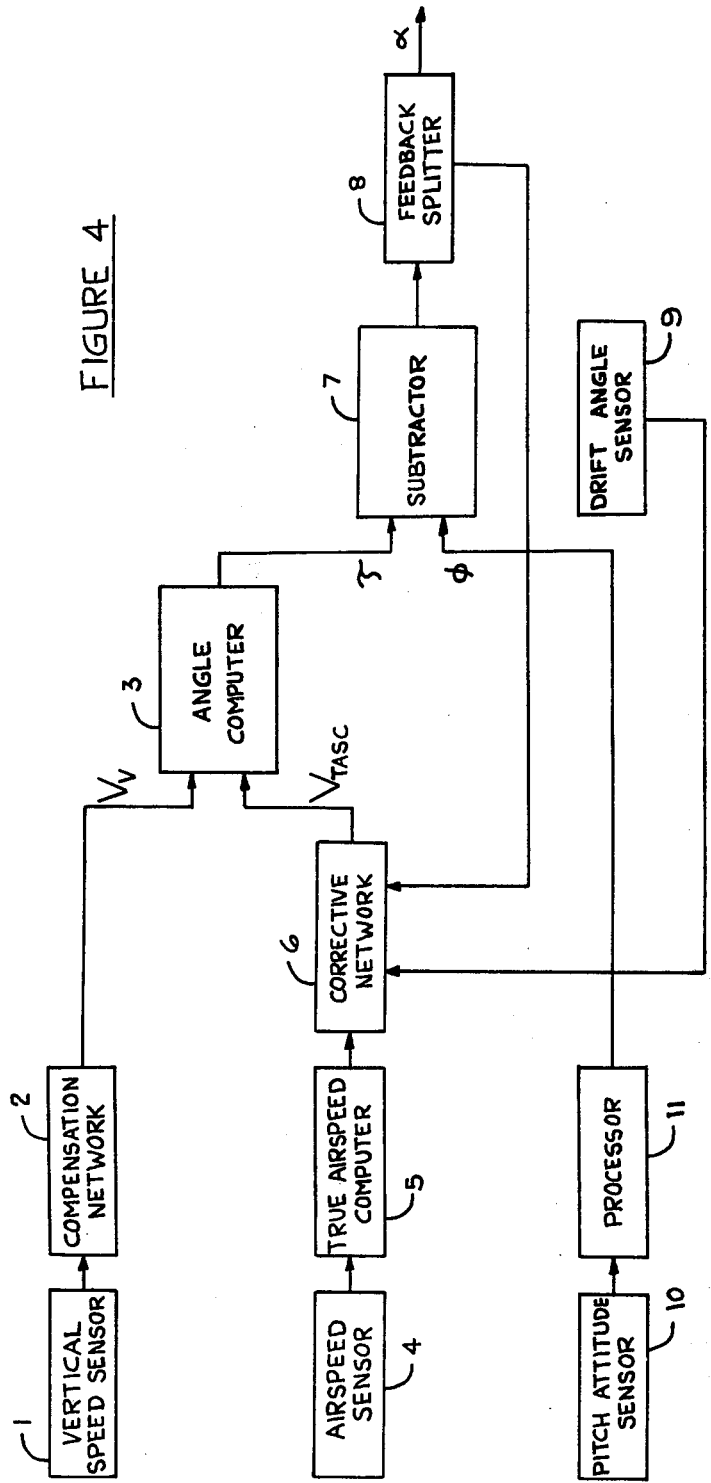

3,930,610

METHOD AND APPARATUS FOR OBTAINING ACCURATELY THE ANGLE OF ATTACK OF AN AIRCRAFT

This invention relates to a method and apparatus for obtaining the angle of attack of an aircraft by processing the true airspeed, the vertical speed, and the angle between the chord line and the horizontal reference.

The angle of attack of certain categories of aircraft, especially during their flight testing, is detected through the use of a vane and pickoff unit located at the extremity of a boom-type support which must be long enough to be outside the turbulence of the aircraft in question. This boom can be positioned on the nose or at the tip of any one wing of the aircraft. The principle involved here is the direction of the relative wind with respect to an aircraft reference.

The angle of attack is also detected through the use of vane transducers relying this time on pressure differential, which varies with the position of the aircraft in relation to the airflow about the latter, at the tip of an aircraft wing.

A third possible type of angle of attack detection involves airflow through a ducted servo-driven turbine and across a speed error detector.

All three preceding methods of angle of attack detection involve external mechanical moving parts which are subject to the various weather differences, fatigue, wear, supersonic speeds, and other related factors like replacement, servicing, and accuracy, thereby decreasing by quite an amount the reliability and practicality of such methods.

An object of the present invention is to provide a method for obtaining the angle of attack of an aircraft without the disadvantages mentioned above which are associated with external mechanical moving parts.

It is a feature of this invention to provide angle of attack information which is as reliable as the basic navigational equipment mandatory in aircraft such as airspeed indication.

An additional object of this invention is the provision of reliable angle of attack information by computing data internally present in an aircraft.

It is a further feature of this invention to provide accurate angle of attack by properly correcting the inputs used in the computing of the angle of attack information.

By a broad aspect of the invention, there is also provided apparatus for obtaining the angle of attack of an aircraft by computing the necessary inputs available or made available in the said aircraft and which are discussed later in this invention.

A further object of the present invention is the use of the system described in the present invention in a manual, partially, or completely automated flying system (including take-off and landing) for all types of weather conditions.

The above mentioned and other objects and features of the present invention will be fully apparent from the following description when taken in conjunction with the accompanying drawings in which:

FIG. 4 is a functional block diagram of the angle of attack system of the present invention.

However, these drawings show only a few embodiments of the present invention, and it is therefore the understanding of the inventor and it is also apparent that further arrangements of the present invention can be derived from the enclosed diagrams with the help of the included description. Also apparent will be the application of the principle utilized in the present invention in other further inventions related to avionics and associated fields.

The present invention generates an angle of attack signal for use in an airborne navigation system. In order to better comprehend the significance of the process involved in the generation of the afore-mentioned angle of attack signal, the behaviour of an aircraft in a steady state air mass will now be considered.

Figure 1:
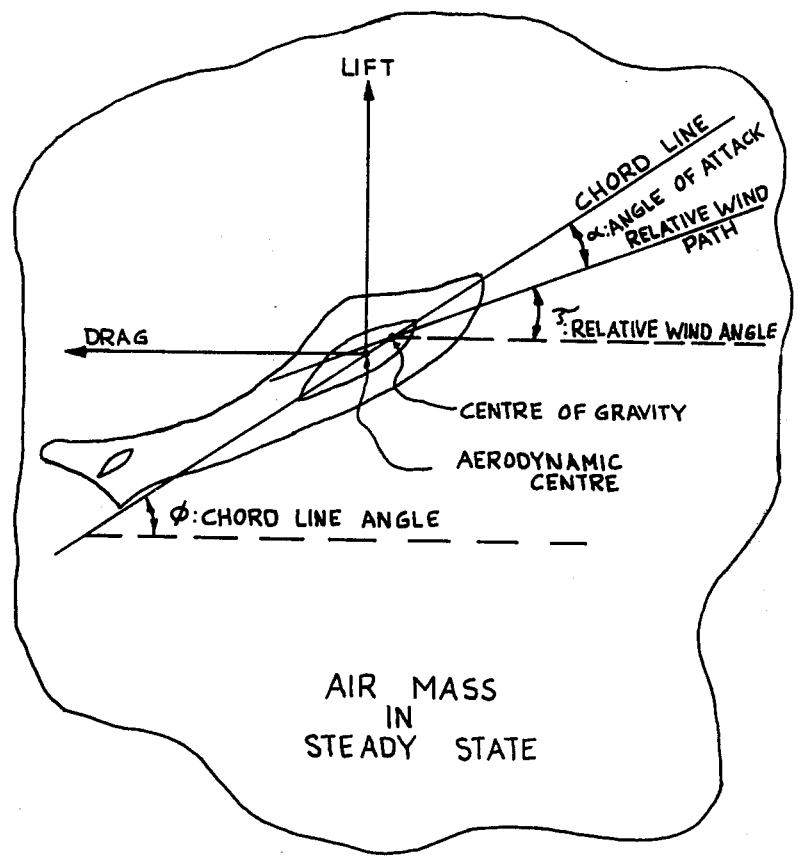
FIG. 1 is a graphical representation of angle of attack.

FIG. 1 represents an aircraft flying in an air mass which is steady with respect to the said aircraft, but which can be moving with respect to a terrestrial reference. Also present is information as accepted in aeronautics.

Referring to FIG. 1, the angle of attack of an aircraft is defined as the angle between the chord line and the relative wind vector. The direction of the said relative wind vector is the direction that the motion of the aircraft's center of gravity has relative to the air mass. Expressed in a trigonometric form, the angle of attack $\alpha$ becomes $$\phi - \tau \qquad 1$$

where
 $\phi$ is the chord line angle (as used herein), that is to say, the angle between the chord line and the horizontal reference, and
 $\tau$ is the relative wind angle (as used herein), that is to say, the angle that the said relative wind vector makes with the said horizontal reference.

The analysis is pursued by dissecting the chord line angle $\phi$ and the relative wind angle $\tau$ so as to arrive at a vectorial and mathematical representation of angle of attack.

Figure 2:
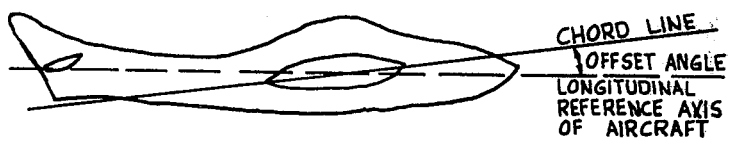
FIG. 2 is a graphical representation of an aircraft's wing offset angle.
Figure 3A:
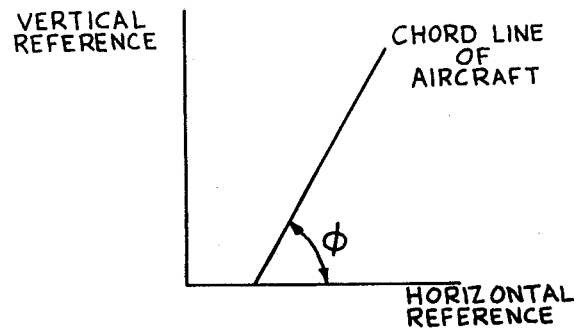
FIG. 3 is a vectorial representation of the definition of angle of attack as used in this invention.

The chord line angle $\phi$, as used herein, is the pitch angle of an aircraft PLUS a small offset angle which is the angle between the longitudinal reference axis of the said aircraft and the chord line of the afore-mentioned aircraft (refer to FIG. 2). It will be appreciated that this offset varies with the type and make of aircraft, but is nevertheless fixed for any particular aircraft (except the variable-position wing type) under any environmental conditions. The angle $\phi$ is represented by FIG. 3a which is used in conjunction with FIG. 3b in the following paragraph.

Figure 3B:
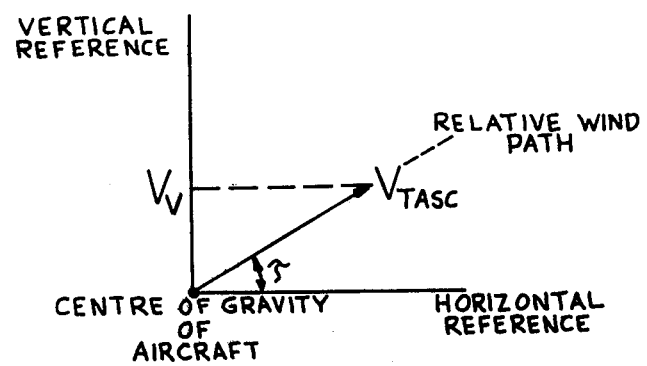

Contrary to the chord line angle $\phi$ which is an aircraft characteristic, the relative wind angle $\tau$ has to be calculated. As such, the trigonometric based calculation will be derived from the vectorial representation, FIG. 3b, of the speed conditions present in FIG. 1 where the aircraft is climbing (this set of conditions has been chosen to illustrate the principle contained in the present invention and not to restrict it to the climbing stage of a flight) at a speed of $V_V$ while on a course at an air-speed (true) of $V_{TAS}$. As shown in FIG. 3b, the vector representing $V_{TAS}$ lies in the same direction as the relative wind (involving an error especially at large angles of attack and drift angles). Referring again to FIG. 3b, the following equation can now be derived:

$$\sin \tau = \frac{V_V}{V_{TASC}}$$

where $V_{TASC} = V_{TAS} + \delta_C$, in which $\delta_C$ is the correction factor for errors in airspeed due to angle of attack and/or drift angle excursions.

$$\therefore \tau = \sin^{-1} \frac{V_V}{V_{TASC}} \quad (2)$$

Figure 3C:
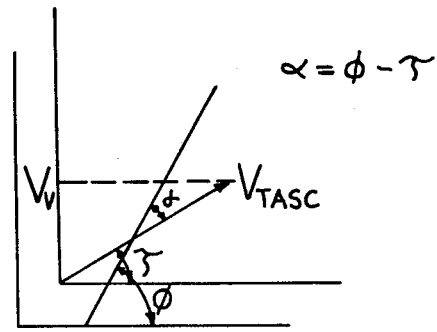

Superimposing FIGS. 3a and 3b results in FIG. 3c which is a vectorial representation of the formulation that follows. Combining equations (1) and (2) in reference to FIG. 3c gives $$\phi - \tau = \phi - \sin^{-1} \frac{V_V}{V_{TASC}}$$

but since $\alpha = \phi - \tau$, $$\alpha = \phi - \sin^{-1} \frac{V_V}{V_{TASC}}$$

where
$\alpha$ is the angle of attack.

Although, for simplicity, the angle of attack formulation has been derived for steady state conditions, the said formulation is nevertheless applicable to transient conditions between steady states.

Having established a method of obtaining the angle of attack of an aircraft and derived an equation for the said angle of attack of an aircraft, a system for obtaining this angle of attack will now be considered. The content of the preceding paragraphs demonstrates that the angle of attack of an aircraft can be interpreted as a function of the speed in the vertical plane, $V_V$, the true airspeed corrected $V_{TASC}$ of an aircraft, and the chord line angle $\phi$.

A functional diagram of an embodiment of the present invention is illustrated in FIG. 4. The upper half portion of the diagram presents the development of the relative wind angle. As previously discussed, the relative wind angle is generated as a function of the vertical speed and true airspeed (corrected) input parameters. A vertical speed sensor 1, with proper compensation 2 (as required) for rapid variations in sensed vertical speed, and possible lag and inherent noise within the said sensor, thus provides to the angle computer 3 an appropriate signal $V_V$ or $h$ which is proportional to the rate of change of altitude. The afore-mentioned input signal — a linear analog function — is applied as a first input to angle computer 3. Since the present invention generates an angle of attack signal as a function of $V_V$, it is imperative that the vertical speed input $V_V$ parameter be as accurate and reliable as possible. A commercially available device for generating a vertical speed signal is made by Teledyne Avionics and marketed under the trade mark IVSI (Inertial-lead Vertical Speed Indicator). Another is made by Litton Systems, and is available through the LTN-51 Inertial Navigation System. Other systems to this end are offered by Bendix and Sperry. If compensation network 2 is still required, such can be devised easily by the man skilled in the art using simple non-complex circuitry.

A signal which is developed from airspeed sensor 4, processed through true airspeed computer 5, and then further corrected for position error (especially at large drift angles and angles of attack by corrective network 6 consists of the second input — also a linear analog function — to angle computer 3. The input to corrective network 6 is entitled true airspeed — TAS, and results when the indicated airspeed (IAS — the actual instrument indication for some given flight condition) is corrected for errors of the instrument and errors due to position or location of the installation to as great an extent as possible (CAS — calibrated airspeed), and other relevant variables affecting the accuracy of the aircraft airspeed signal such as compressibility effects and density. These corrections are quite necessary for accurate determination of true airspeed and meeting the intent of the present invention. A true airspeed computer may be an air data computer such as a Bendix Central Air Data Computer — ADC 1400. One of the outputs from this unit is a true airspeed signal. Another unit is made by Teledyne Controls — Type AXC 602. The task performed by corrective network 6 is that of improving the true airspeed signal from said computer 5 as a function of angle of attack, from the subtractor 7 through feedback splitter 8, and drift angle, from drift angle sensor 9, such that the output of computer 5 is further compensated for possible position error (airspeed sensor vs relative wind) still present at the said output of computer 5. At this point, the true airspeed becomes the true airspeed corrected — TASC (as used herein). The corrective network 6 would consist of non-complex circuitry obvious to one skilled in the art since the error is capable of being considered as the sum of linear segments.

The angle computer 3 produces an output signal proportional to angle $\tau$ which results from taking the inverse sine of the ratio of vertical speed $V_V$ to true airspeed corrected $V_{TASC}$, as can be seen by referring to FIG. 3b and equation (2). Details of an embodiment of angle computer 3 will also be discussed later in this present invention.

The subtractor 7 receives two inputs, one of which is the output signal from angle computer 3. The aforementioned signal is subtracted from a second input that is generated from pitch attitude sensor 10 which may be a vertical gyro. The signal originating from the said pitch attitude sensor 10 is directed to processor 11 where the angular information contained in its input is transferred into an appropriate analog signal directly proportional to chord line angle $\phi$ (the pitch angle PLUS the proper chord line offset angle). Then, the processed signal $\phi$ is applied to subtractor 7. The end product of the subtraction — namely, the required angle of attack $\alpha$, taking place in afore-mentioned subtractor 7 then feeds feedback splitter 8. The purpose of said feedback splitter 8 is to supply corrective network 6 with the necessary angle of attack feedback signal required to correct true airspeed $V_{TAS}$ accordingly for errors due to various angles of attack present during a flight. The feedback splitter 8 does not in any way alter the characteristics of the signal developed through subtractor 7 which is the angle of attack and the required information generated by the present invention.

Figure 5:
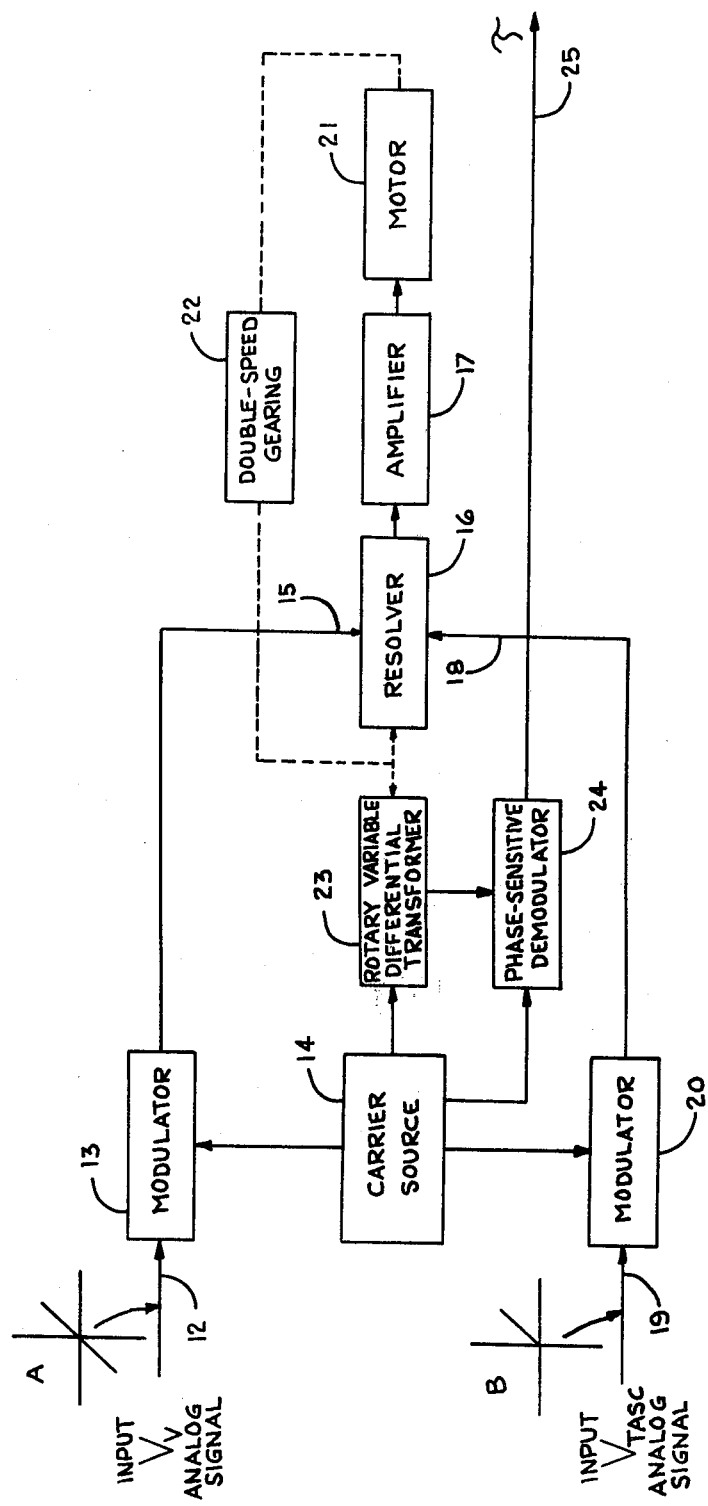
FIG. 5 is a functional diagram of a type of network for utilization in FIG. 4 by which the relative wind angle may be computed.

FIG. 5 represents a functional sub block diagram of an angle computer 3 which may receive the inupt vertical speed signal $V_V$ from compensation network 2 and the input true airspeed corrected signal $V_{TASC}$ from corrective network 6, and develop therefrom an output directly proportional to the relative wind angle $\tau$ in accordance with that previously described and shown in FIG. 3b. With reference to FIG. 5, the input vertical speed signal and the input true airspeed corrected signal are linear analog functions A and B respectively, as illustrated. Furthermore, the said functions A and B are individually scaled to obtain the same conversion factor — X volt units/speed unit, in order to be able to compute the angle $\tau$ made by $V_{TASC}$ with respect to the horizontal reference as seen in FIG. 3b. Pursuing further, input 12 is fed to modulator 13 where it is superimposed on an alternating reference signal from carrier source 14. The modulated output 15 is then applied across the appropriate sine (with respect to the excited stator winding mentioned in line 26 of this page) rotor winding of resolver 16 and the input of amplifier 17, the latter input being connected in series with the aforementioned sine rotor winding of said resolver 16. The cosine rotor winding of resovler 16 is terminated with the proper dummy load. In addition, one of the stator windings of resolver 16 is supplied with modulated signal 18 composed of an alternating voltage from carrier source 14 whose amplitude varies as input $V_{TASC}$ 19 after going through modulator 20. The other stator winding of said resolver 16 is short-circuited. The said amplifier 17 consequently drives motor 21 until the input to amplifier 17 is null, which is possible only when the rotor shaft of resolver 16 has been turned to angle $\tau$ by said motor 21 through appropriate double-speed gearing 22. Simultaneously, the rotor of rotary variable differential transformer 23, whose input is electrically supplied by carrier source 14, is also positioned at angle $\tau$ by motor 21 through afore-mentioned double-speed gearing 22. The output of rotary variable differential transformer 23, which is a signal containing the information on angle $\tau$, is fed to a phase-sensitive demodulator 24 controlled by a reference signal from said carrier source 14. The output signal 25 developed through the detection process of said phase-sensitive demodulator 24 is therefore an analog signal directly proportional to angle $\tau$.

The angle computer 3 of the invention, as embodied in FIG. 5, is thus seen to provide an analog signal directly proportional to the relative wind angle $\tau$ which varies as a function of vertical speed and true airspeed corrected, and whose quality depends on the judicious choice and arrangement of the various components embodied in the angle computer 3. As previously discussed, the output from said angle computer 3 is combined with chord line angle $\phi$ from processor 11 to arrive at the angle of attack $\alpha$.

The present invention is thus seen to provide an angle of attack information that can be very accurate for application in systems relying on angle of attack data, and which is developed as a result of an appropriate processing of the vertical speed, the airspeed, and the pitch attitude of an aircraft. Although the present invention has been described with respect to a particular embodiment thereof, it is not to be so limited as changes might be made therein which fall within the scope of the invention as defined in the appended claims.

The embodiments of the invention in which an exclusive property or privilege is claimed are defined as follows:

1. A system for generating a signal representative of the angle of attack of an aircraft using vertical speed, air speed and pitch attitude data, said system comprising means for generating a pitch attitude signal proportional to aircraft pitch attitude, a processor for receiving said pitch attitude signal and for developing therefrom an output signal the magnitude and sense of which vary as a function of the aircraft chord line angle, means for generating a relative wind angle signal, comparison means for receiving and differentially combining said relative wind angle signal and the output signal from said processor so as to produce a signal whose magnitude and sense are respectively definitive of the extent and direction of the aircraft angle of attack, said means for generating a relative wind angle signal including an airspeed sensor for producing an airspeed signal, a corrective network connected to the output of said airspeed sensor for correcting said airspeed signal so as to provide a true airspeed signal, drift angle sensor means for generating a drift angle signal, means for connecting said drift angle signal to said corrective network and feedback means for connecting the output of said comparison means to said corrective network.

2. A system for generating a signal representative of the angle of attack on an aircraft using vertical speed, airspeed and pitch attitude data, said system comprising means for generating a pitch attitude signal proportional to aircraft pitch attitude, a processor for receiving said pitch attitude signal and for developing therefrom an output signal the magnitude and sense of which vary as a function of the aircraft chord line angle, means for generating a relative wind angle signal, comparison means for receiving and differentially combining said relative wind angle signal and the output signal from said processor so as to produce a signal whose magnitude and sense are respectively definitive of the extent and direction of the aircraft angle of attack, said means for generating a relative wind angle signal including an airspeed sensor for producing an airspeed signal, means for generating a vertical speed signal, a vertical speed signal modulator, an airspeed signal modulator, a carrier source for coupling a reference signal to said vertical speed signal modulator and said airspeed signal modulator, a resolver for producing a signal related to an angle whose sign is the ratio of said vertical speed signal over said airspeed signal, said resolver including first and second inputs for receiving the outputs of said vertical speed signal modulator and said airspeed signal modulator, a feedback loop, including a motor, connected to said resolver for adjusting the angular position of the resolver rotor so as to nullify the effect of the input signals to said resolver, and means including a rotary variable differential transformer and a phase-sensitive demodulator, controlled by said carrier source and responsive to the output of said resolver, for producing an electrical signal proportional to the relative wind angle.

3. A method of producing a signal proportional to the angle of attack of an aircraft in flight, comprising generating a vertical speed signal, an airspeed signal, and a pitch attitude signal, resolving the inverse sine of the ratio of the vertical speed signal over the airspeed signal so as to generate a relative wind angle signal, generating a chord angle signal by adding an offset angle signal related to the geometry of the aircraft to said pitch signal and differentially combining said relative wind angle signal and said chord line angle signal so as to produce a signal which is proportional to the angle of attack of said aircraft, said method further including generating a drift angle signal and applying said drift angle signal to a corrective network, and feeding back said signal proportional to the angle of the attack to said corrective network so as to obtain a corrected true airspeed signal.

* * * * *